United States Patent [19]
Metzler

[11] 3,966,231
[45] June 29, 1976

[54] TRAILER ALIGNER

[75] Inventor: Robert P. Metzler, Ypsilanti, Mich.

[73] Assignee: RPM Marketing Enterprises, Inc., Bloomfield Hills, Mich.

[22] Filed: Dec. 6, 1974

[21] Appl. No.: 530,238

[52] U.S. Cl. ............................................. 280/477
[51] Int. Cl.² ........................................ B60D 1/06
[58] Field of Search ..................... 280/477; 33/264; 116/28 R

[56] References Cited
UNITED STATES PATENTS

| | | | |
|---|---|---|---|
| 2,815,732 | 12/1957 | Majors | 280/477 X |
| 3,015,162 | 1/1962 | Bohnet | 116/28 R X |
| 3,702,029 | 11/1972 | Anderson | 33/264 |
| 3,765,703 | 10/1973 | Voelkerding | 280/477 |
| 3,818,599 | 6/1974 | Tague | 280/477 X |

Primary Examiner—Robert R. Song
Assistant Examiner—R. Schrecengost
Attorney, Agent, or Firm—Robert M. Phipps

[57] ABSTRACT

Disclosed is a device for the alignment of an automotive vehicle and a trailer. Also disclosed is a simple method of alignment for coupling of the automotive vehicle and trailer which utilizes two of the devices. The aligner device consists of a marking rod having attached at one end thereof and perpendicular to the longitudinal axis of said rod magnetic positioning means.

5 Claims, 3 Drawing Figures

TRAILER ALIGNER

BACKGROUND

1. Field of the Invention

This invention relates to means for and a method of coupling large trailers to automotive vehicles.

2. The Prior Art

In the coupling of small trailers, i.e., Society of Automotive Engineers Class I trailers, to automotive vehicles, e.g., trucks, automobiles and the like, because of the ease of moving the small trailer it is customary to only approximately position the automotive vehicle to the trailer and then complete the coupling by moving the trailer to the vehicle. However, trailers larger than SAE Class I, i.e., above 2,000 pounds gross weight and tongues of more than 200 pounds, cannot be so simply moved. In this case it is necessary to exactly position the coupler ball on the automotive vehicle under the trailer coupler socket and then lower the trailer coupler socket on to the ball in completion of the coupling. Until now this exact location or spotting of the automobile was accomplished by sheer luck, or by a second person guiding the automobile operator, or the operator using a special system of mirrors. In any event the coupling sequence was not looked upon as a quick, simple task.

SUMMARY OF THE INVENTION

In accordance with this invention there is provided a trailer alignment device comprising in combination an indicating rod having attached at one end thereof and perpendicular to the longitudinal axis of said rod magnetic holding or positioning means. Also provided is a method employing ythe foregoing device which permits the operator of an automotive vehicle to singularly align the vehicle and trailer for coupling while operating the vehicle.

DESCRIPTION OF THE PREFERRED EMBODIMENTS

Figure 1:
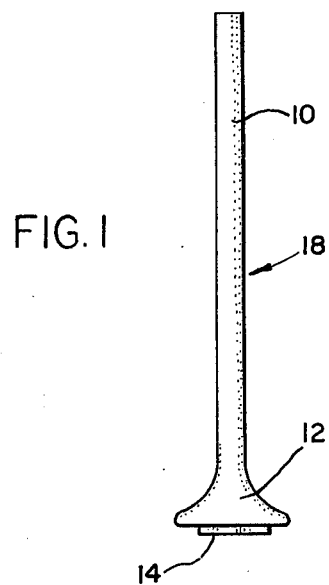
FIG. 1 illustrates in side view the aligner 18 of this invention.

The aligner 18 of this invention as shown in FIG. 1 is comprised of a slender rod or shaft 10 which has attached to one end thereof magnetic positioning or holding means as shown by magnet receiving means 12 holding one or more magnets 14. The shaft 10 and receiving means 12 can be separate pieces which are fasten together by friction fitting the rod 10 into a receiving chamber (not shown) in the receiving means 12 or by gluing or fusing shaft 10 and receiving means 12 together or by other conventional means. In such cases rod 10 and means 12 can be fabricated out of different materials of construction, e.g., rod 10 of wood and receiving means 12 of nonferrous metal. Alternatively rod 10 and receiving means 12 can be molded or extruded as one pience from a plastic or resinous material, that is a thermoplastic such as nylon or polyolefin or a thermoset material such as phenolic resin.

Figure 2:
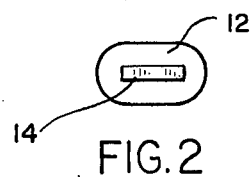
FIG. 2 is an end view of the aligner 18.

Fitted into the receiving means 12 is a magnet 14 or a plurality of magnets 14. While the configuration of the magnet 14 is a matter of choice it is preferred for ease of manufacture and use to employ a magnet 14 in a bar or elongated shape. In any event the longitudinal axis and exposed gripping face of the magnet 14 is perpendicular to the longitudinal axis of rod 10. For further clarity an end view of the magnet 14 containing end of the aligner 18 is shown in FIG. 2. The magnet receiving means 12 surrounds magnet 14 but allows the magnet's 14 surface to be exposed permitting maximum development of magnetic force holding th aligner 18 to metal surface.

The length of shaft 10 can be varied according to the height required to see the shaft 10 through the rear window of the particular automotive vehicle, however, a typical length would be on the order of 3 or 4 feet. Indeed if so desired the shaft 10 can be made telescoping in nature to permit use on a number of different models or types of automotive vehicles. The magnet 14 can be varied in size as desired with the minimum size having sufficient strength to maintain the aligner 18 in position when in use. Typically a 5 to 15 pounds of force magnet 14 would suffice depending on the length of shaft 10.

Figure 3:
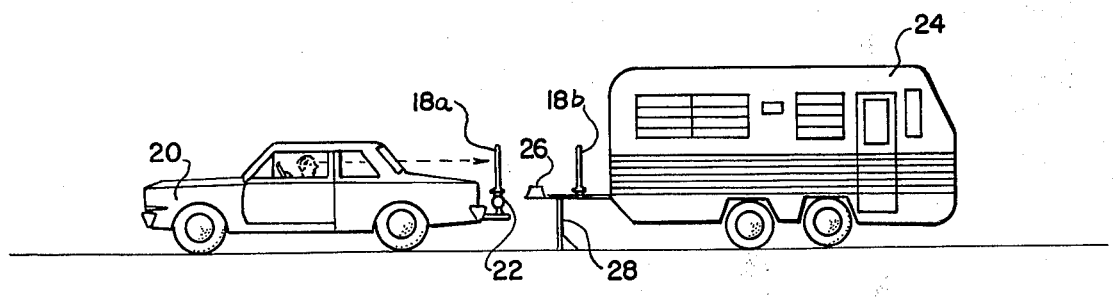
FIG. 3 illustrates the use of the aligner 18.

As shown in FIG. 3 maximum advantage of the aligner 18 of this invention is obtained when two aligners 18a, 18b are used in cooperation in the coupling of an automobile 20 equipped with hitch ball 22 and trailer 24 equipped with a socket or coupler 26. As is customary with trailers larger than Class I trailer 24 is equipped with a trailer tongue support 28. The tongue support 28 is adjusted so the bottom of socket or coupler 26 is elevated just slightly higher than the top of ball 22. Aligner 18b is placed on the top of trailer tongue 30 preferably just back of socket 26 or on the socket 26 itself. Another aligner 18a is placed on top of ball 22. The automobile is then driven in reverse gear to the trailer 24 as the operator aligns the two aligners 18a, 18b while looking through the automobile's 20 rear window. When the aligners 18a, 18b appear to be substantially superimposed on each other the vehicle 20 is continued slowly rearwardly until aligner 18a is tipped off of ball 22 by coupler or socket 26. When the operator sees the aligner 18a tip over the automobile 20 is stopped and socket 26 is lowered on ball 22 to complete the coupling of automobile 20 and trailer 24. The shaft 10 of aligner 18a can be of a different color from the shaft 10 of aligner 18b so as to further assist the operator in aligning the automobile 20 and trailer 24.

The foregoing example of an aligner and method of using same have been described in the foregoing specification for the purpose of illustration and not limitation. Many other modifications and ramifications will naturally suggest themselves to those skilled in the art based on this disclosure. These are intended to be comprehended as within the scope of this invention.

The embodiments of the invention in which an exclusive property or privilege is claimed are defined as follows:

1. A trailer aligner device for trailers equipped with a ball and socket type trailer hitch comprising in fixed non-rotatable combination an indicating rod having attached at one end thereof magnetic positioning means which is axially aligned with said rod, the gripping surface of said means is perpendicular to the longitudinal axis of said rod, said means being adapted to retain said device when positioned only on the top flat portion of the coupler ball whereby the bottom of the aligner device is engaged with the flat top portion of said ball and is disengaged from said ball by contacting said aligner with the socket of the trailer hitch.

2. The aligner of claim 1 wherein the magnetic positioning means is comprised of a magnet receiving means in combination with a magnet.

3. The aligner of claim 2 wherein the rod and magnet receiving means is one continous piece of shaped plastic.

4. The aligner of claim 2 wherein the rod and magnet receiving means are two separate pieces joined togather.

5. A method of aligning automotive vehicles with trailers for the purpose of coupling said vehicle and said trailer togather said trailer being larger than Society of Automotive Engineers Class I trailers and equipped with a ball and socket type trailer hitch which comprises placing a first aligner device of claim 1 in an upright position on the flat top portion of said ball, coupler on said automotive vehicle, placing a second aligner device of claim 1 in an upright position on or adjacent the socket of the tongue of the trailer to be coupled, slowly rearwardly moving the vehicle towards the trailer while through the rear window of said vehicle the operator of said vehicle aligns said first aligner device with the second aligner device and then continuing rearwardly the vehicle until the first aligner device on the ball coupler is disengaged from said ball by the socket of said tongue, at which point said vehicle is stopped and now aligned for coupling with said trailer, there being no mechanical linkage between the two aligners.

* * * * *